(No Model.)

W. WATKINS.
WINDMILL.

No. 391,995. Patented Oct. 30, 1888.

Witnesses.
L. J. Gardner,
Allen J. Pattison,

Inventor.
Wm. Watkins,
per F. A. Lehmann, atty.

UNITED STATES PATENT OFFICE.

WILLIAM WATKINS, OF GALVESTON, TEXAS.

WINDMILL.

SPECIFICATION forming part of Letters Patent No. 391,995, dated October 30, 1888.

Application filed May 11, 1888. Serial No. 273,597. (No model.)

*To all whom it may concern:*

Be it known that I, WILLIAM WATKINS, of Galveston, in the county of Galveston and State of Texas, have invented certain new and useful Improvements in Windmills; and I do hereby declare the following to be a full, clear, and exact description of the invention, such as will enable others skilled in the art to which it pertains to make and use it, reference being had to the accompanying drawings, which form part of this specification.

My invention relates to an improvement in windmills; and the objects of my invention are to combine with a windmill a horse-power, so that when the wind ceases to operate the wheel horse-power may be brought into use for the purpose of continuing the revolution of the wheel, so as to enable the windmill to be used like an ordinary horse-power, and to place the slides or doors upon suitable supports, so that they can be moved back and forth in relation to the wheel for the purpose of cutting off the wind from it.

Figure 1:
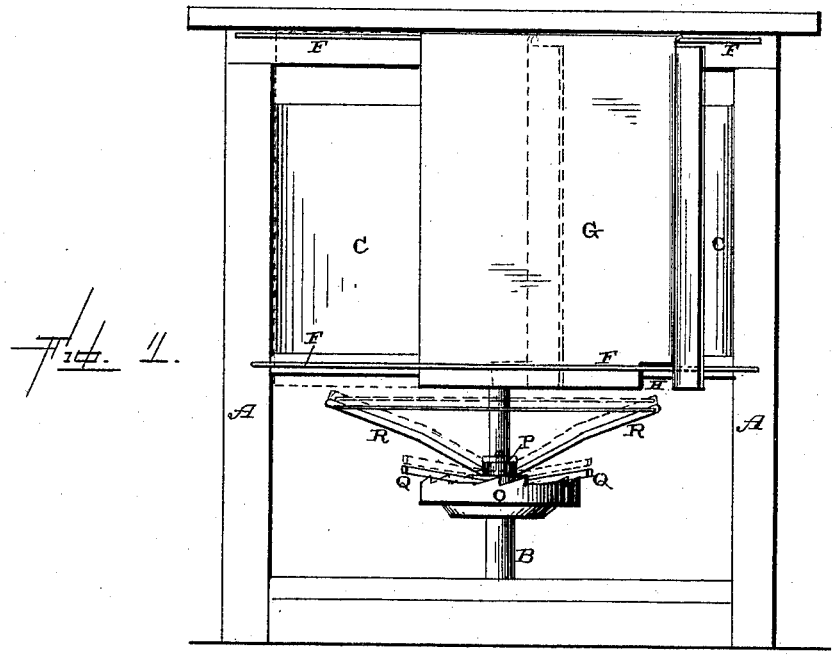
Figure 2:
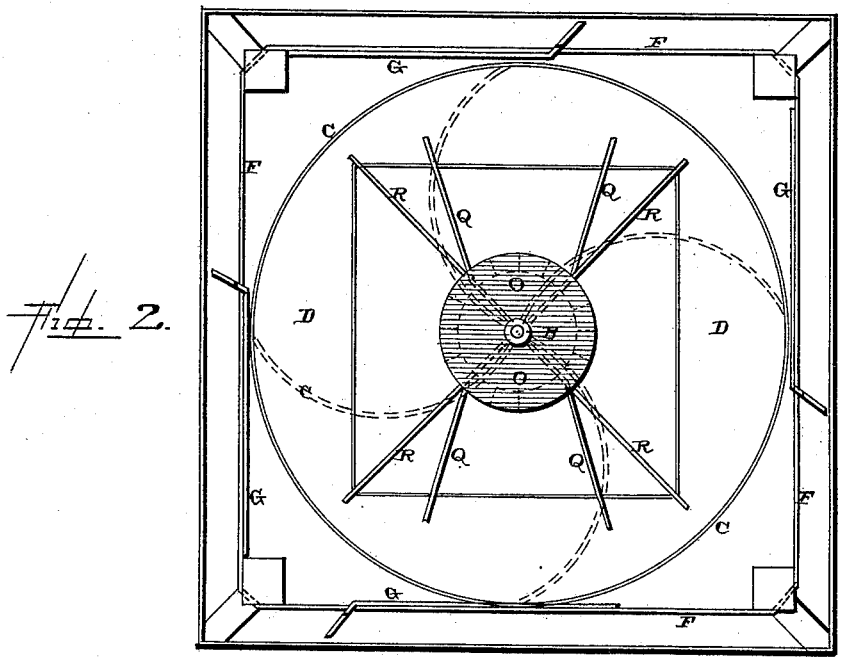

Figure 1 is a side elevation of a windmill embodying my invention. Fig. 2 is an inverted view of the same, the wheel being shown in dotted lines.

A represents a suitable frame, which can be placed upon the top of a house or any other suitable support, and in which the wheel-shaft B, having the wind-wheel C secured to it, is journaled. The vanes of this wheel C are curved, as shown, and secured at their lower edges to the disk D, upon which they rest and to which they are secured at their outer lower corners. Stretched across the frame upon each of its sides are the two horizontal guides F, and hung upon these two guides F are the doors or slides G, which can be moved freely back and forth in relation to the wheel for the purpose of regulating its power upon it. These doors or slides G are connected to the upper guide F, and in their lower edges are cut the notches H, through which the lower guide F passes. The lower edges of the doors or slides G are not connected to the lower guide F, except by the notches H, and these notches serve to keep the lower portions of the doors or slides in position. When these doors or slides are moved so as to allow the wind to strike the curved sides of the vanes, the wheel is made to revolve; but when the doors or slides are moved so as to intercept the wind and to prevent it from striking against the curved sides of the vanes the wheel will stop. These doors or slides, being adapted to be adjusted freely back and forth across the frame and in front of the wheel, can be adjusted so as to shut off all or only a portion of the wind from the curved sides of the vane, as may be desired, and thus the wheel may be brought either to a dead-stop or it may be made to revolve slowly, as may be desired. One edge of each of the doors is curved outward, as shown, to increase the size of the opening to catch a greater volume of wind, and thus greatly increase the pressure of the wind and the speed of the wheel.

Where the wheel is intended to be used in driving machinery and the pressure of the wind decreases to that point where it will not operate the wheel, the machinery must be stopped until the wind again blows sufficiently hard to drive the wheel. Frequently the wind is blowing, but not quite hard enough to operate the wheel, and with the addition of a very little help the wheel can be made to run so as to operate the machinery.

In order to give to the wheel the additional power that is needed when the wind is blowing very lightly, a crown ratchet-wheel, O, is secured to the shaft B, and placed upon this shaft is a loose collar, P, which has a slight rising-and-falling movement thereon, and to which collar are secured the draft-bars Q and the leading-bars R. The draft-bars catch in the teeth of the crown-wheel O, and as the horses are driven around the shaft these bars by catching against the ratchet cause the shaft and the wheel secured thereto to revolve. Should the horse be standing still and the wheel begin to revolve, the draft-bars will slip idly around over the teeth of the wheel without being affected. As soon, however, as the horse or horses start up the draft-bars engage from their own gravity with the teeth of the wheel, and then the wheel is made to revolve by horse-power alone, or the power of the horses may be used in connection with the wind, so as to give the requisite amount of power to drive the machinery which is connected to the wheel. Of course while the wind is playing briskly the horse-power will not be brought into play; but as soon as the wind decreases to that point where it does not furnish sufficient power to operate the wheel, then the horse-power is brought into play and the two used in connection with each other.

Having thus described my invention, I claim—

1. The combination of the shaft, the wind-wheel which is connected thereto, the ratchet-wheel O, the collar P, placed upon the shaft and having a slight vertical play, and the draft-bars secured to the collar, substantially as described.

2. The combination of the wind-wheel, the shaft B, to which the wheel is secured, the crown-wheel O, secured to the shaft, the vertically-movable collar P, placed upon the shaft, and the leading and draft rods secured to the collar, substantially as set forth.

In testimony whereof I affix my signature in presence of two witnesses.

WILLIAM WATKINS.

Witnesses:
J. KRONN,
H. M. LANG.